ically connected together side by side, extending about rollers at each end of the floor, a group of shafts is mounted transversely along the reach of the belt between the upper and lower sections with rollers on the shafts which touch the top and bottom portions of the belt. These rollers are supported by base rollers mounted upon the deck of the truck underneath the lower reach of the belt. The shafts also carry longitudinal beams having low friction upper surfaces adjacent to the rollers to support the upper reach of the belt. A suitable chain drive is provided to operate the movable floor.

United States Patent [19]
Koral

[11] 3,913,760
[45] Oct. 21, 1975

[54] MOVABLE FLOOR FOR THE DECK OF A TRUCK

[76] Inventor: Ephraim Koral, 330 S. Forest St., Denver, Colo. 80222

[22] Filed: Aug. 23, 1973

[21] Appl. No.: 390,684

[52] U.S. Cl. ............... 214/83.36; 198/184; 198/195
[51] Int. Cl.² .......................................... B60P 1/00
[58] Field of Search ......... 214/83.36; 198/184, 195, 198/137, 196, 197, 189, 204, 138

[56] References Cited
UNITED STATES PATENTS

| | | | |
|---|---|---|---|
| 853,129 | 5/1907 | Simpson | 198/195 |
| 2,430,720 | 11/1947 | Kline et al. | 198/195 |
| 2,679,941 | 6/1954 | Roesies | 198/195 |
| 2,682,959 | 6/1954 | Regier | 214/83.36 |
| 3,773,167 | 11/1973 | McGinnis | 198/184 |

FOREIGN PATENTS OR APPLICATIONS

| | | | |
|---|---|---|---|
| 519,415 | 5/1953 | Belgium | 198/138 |
| 35,951 | 7/1935 | Netherlands | 198/184 |

*Primary Examiner*—Frank E. Werner
*Assistant Examiner*—Donald W. Underwood
*Attorney, Agent, or Firm*—Van Valkenburgh, Lowe & Law

[57] ABSTRACT

A movable floor for the deck of a truck or van to facilitate loading and unloading the same. The floor is formed as an endless belt, of transverse slats pivotally connected together side by side, extending about rollers at each end of the floor, a group of shafts is mounted transversely along the reach of the belt between the upper and lower sections with rollers on the shafts which touch the top and bottom portions of the belt. These rollers are supported by base rollers mounted upon the deck of the truck underneath the lower reach of the belt. The shafts also carry longitudinal beams having low friction upper surfaces adjacent to the rollers to support the upper reach of the belt. A suitable chain drive is provided to operate the movable floor.

8 Claims, 9 Drawing Figures

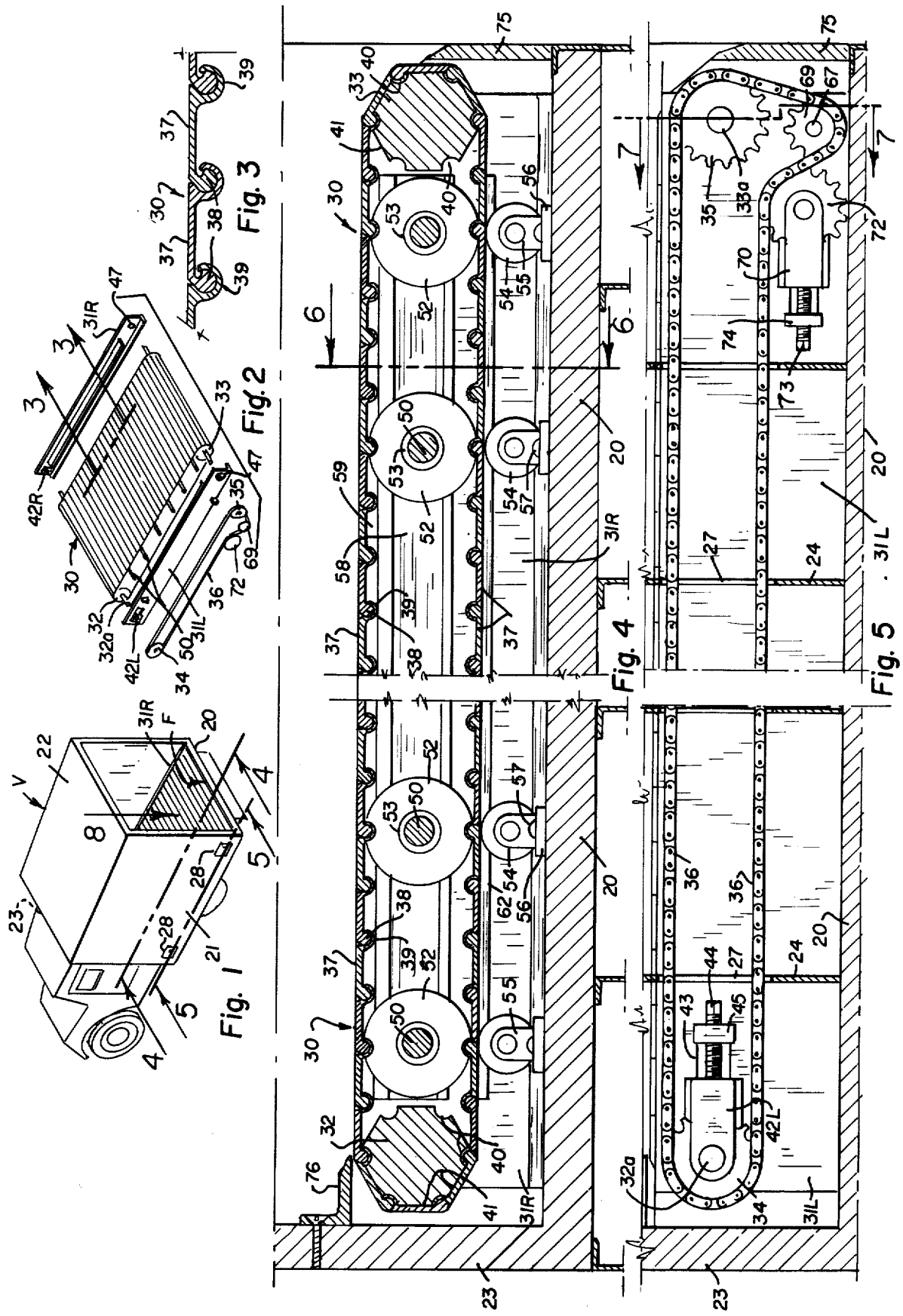

MOVABLE FLOOR FOR THE DECK OF A TRUCK

This invention relates to means and apparatus for loading trucks and similar vehicles and more particularly to improvements in movable floors upon the deck of a truck or trailer to accomplish such loading and unloading operations.

The concept of a movable floor upon the deck of a truck, or trailer, to facilitate loading and unloading operations is not new and such apparatus is used with certain types of hay loading equipment. However, the same has not come into use for general purpose trucks and trailers which carry light and moderately heavy loads such as furniture. Trucks for such purposes are ordinarily vans or similar enclosed vehicles and space is at a premium. If a moving floor were conventionally designed to hold even moderate loads, and was mounted inside a van, it would be too bulky for the space available and very awkward to operate. A desirable design of a movable floor would be to provide small, lightweight components which could support the loads placed on the movable floor. Ordinarily, a movable floor of any type for trucks, or otherwise, will be a web or integrated transverse slats forming a belt and will move about rollers at each end of the deck of the truck. Such a belt must be suspended along its reach by intermediate slides and rollers to sustain the loads thereon. However, the intermediate slides and rollers must be placed within the belt loop and span the width of the truck. If the movable floor is to be compact, these members must be small and the problems of supporting a load upon the belt forming a movable floor can become overwhelming. For example, the belt, the shafts and other components supporting the belt may flex and sag to an excessive degree.

The present invention was conceived and developed with such and other factors in view and comprises, in essence, a movable floor for the deck of a truck or trailer, preferably, but not necessarily, for a van or like enclosed unit. The movable floor is arranged in a compact, symmetrical manner having both slides and rollers across the reach of the floor, which are load bearing members and which in turn are supported directly upon the deck of the truck by a unique arrangement of complementary rollers extending through the bottom reach of the movable floor.

It follows that an object of the present invention is to provide a novel and improved construction of a movable floor upon the deck of a truck, or trailer, which will greatly facilitate the loading and unloading of the truck.

Another object of the invention is to provide a novel and improved movable floor upon the deck of an enclosed truck, such as a van, which can receive freight at the rear end of the truck and move this freight forwardly into the truck enclosure as it is being loaded, all in a quick, efficient manner, and which can also quickly and efficiently unload the truck in the same manner.

Another object of the invention is to provide an improved movable floor for the deck of a truck or trailer which is capable of sustaining a substantial load and yet is a surprisingly compact, lightweight structure.

Other objects of the invention are to provide a movable floor for the deck of a truck or trailer which is a simple, neat, structural arrangement of components and which is easily operated, economical, rugged and durable.

With the foregoing and other objects in view, my present invention comprises certain constructions, combinations, and arrangements of parts and elements as hereinafter described, defined in the appended claims ad illustrated in a preferred embodiment in the accompanying drawings in which:

FIG. 1 is a small scale isometric view of a typical van-type truck viewed from the rear and illustrating within the body of the van a movable floor constructed according to the present invention;

FIG. 2 is a somewhat diagrammatic, isometric exploded view of certain components of the movable floor which are mounted within the truck shown at FIG. 1;

FIG. 3 is a fragmentary sectional detail of a preferred segmented-type belt structure which may be used in the present invention, as taken substantially from the indicated line 3—3 at FIG. 2, but on a greatly enlarged scale;

FIG. 4 is a longitudinal sectional view of the deck and a portion of the front wall of the truck shown at FIG. 1, and of the movable floor structure mounted thereon, the view being taken from the indicated line 4—4 at FIG. 1, but on an enlarged scale and with portions broken away to conserve space;

FIG. 5 is a longitudinal sectional view similar to FIG. 4, but taken from the indicated line 5—5 at FIG. 1, at the side wall of the truck, to show the drive mechanism for the movable floor;

Figure 9:
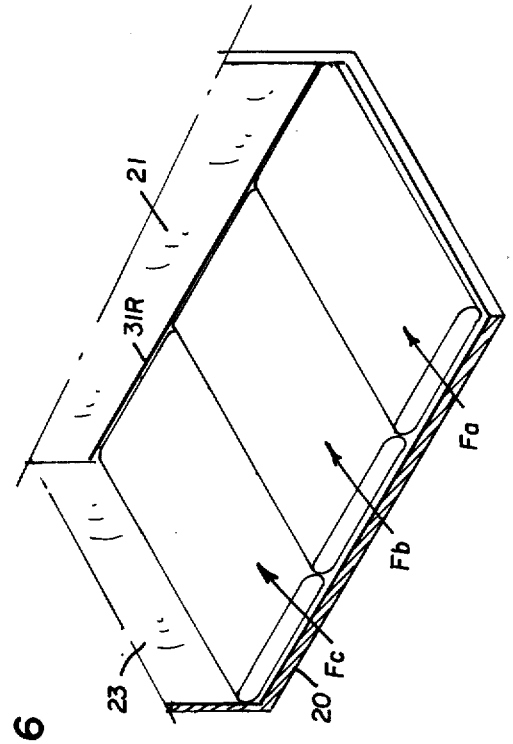
Figure 7:
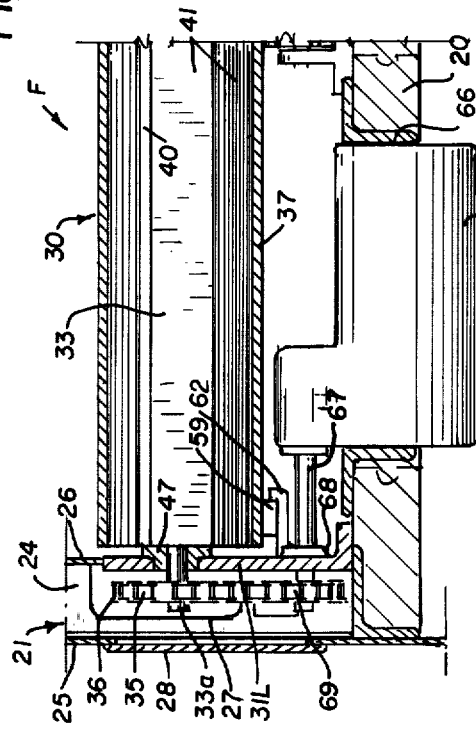
Figure 8:
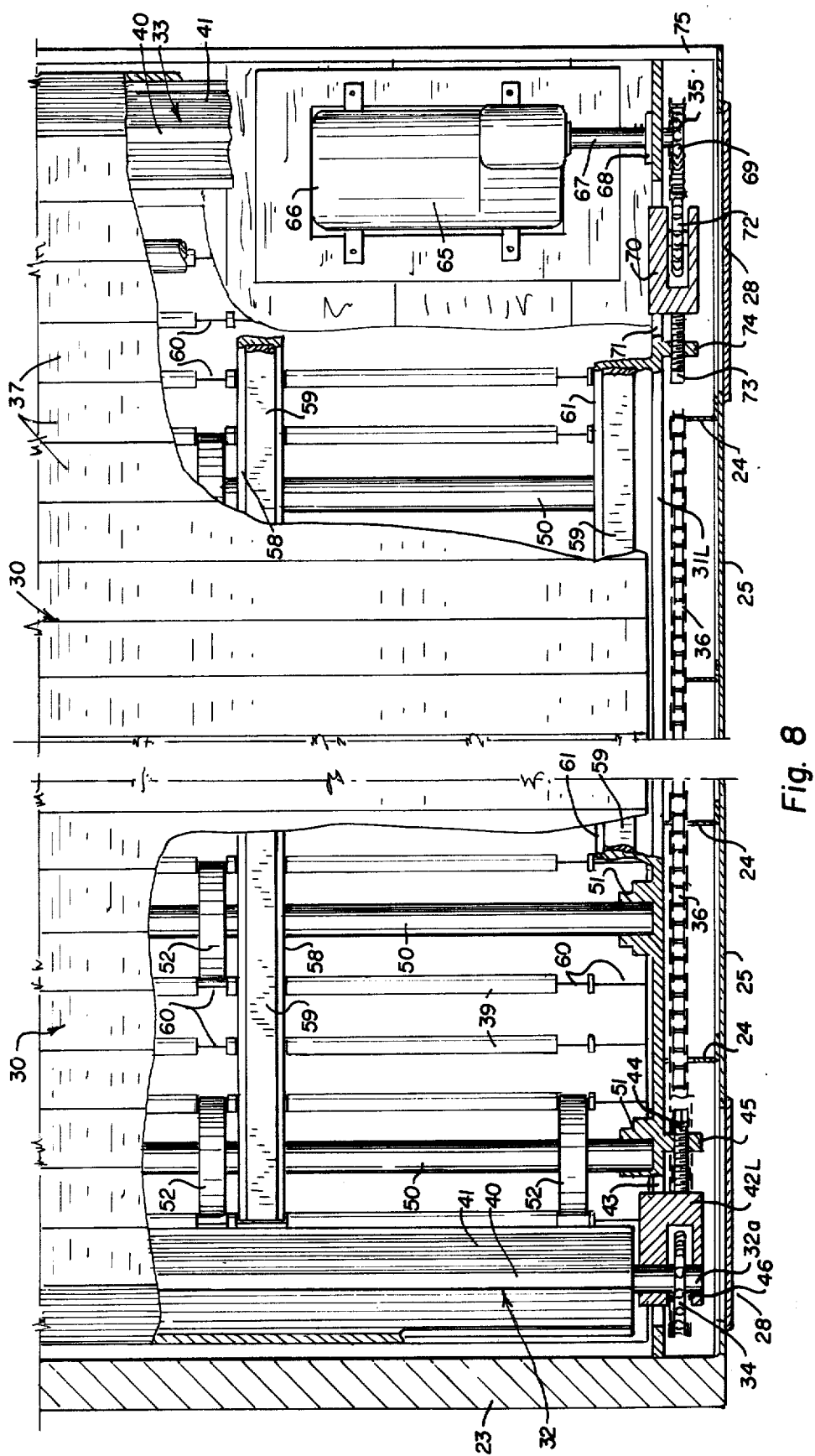

FIG. 7 is a fragmentary sectional view of the drive mechanism of the apparatus mounted in an opening in the truck deck, as taken substantially from the indicated line 7—7 at FIG. 5; FIG. 8 is a plan view of portions of one side of the movable floor and of the adjacent wall sections of the van, as taken from the indicated arrow 8 at FIG. 1, but on an enlarged scale and with portions of certain components being broken away to show parts otherwise hidden from view; and FIG. 9 is a diagrammatic isometric sectional view of a portion of the inside of a van where the structure is modified by providing three independent movable floor units in tandem.

Referring more particularly to the drawings, FIG. 1 illustrates a truck having its deck enclosed as a van V wherein a movable floor F may be installed. The van V conventionally provides the box-like enclosure upon the deck 20 of the truck, and includes side walls 21, a top 22 and a front wall 23. The van V is normally accessible from its rear, as shown, and it is closed by gates, not shown. It is preferable to install the movable floor F in a van which is to be used for moving furniture, mail bags, cartons and the like which are conveniently loaded from the rear of the truck, but this is not essential because the movable floor F could be mounted upon a flat-deck truck or even upon an enclosed or open-deck trailer. However, certain features of the van lend themselves to an effective efficient arrangement in the present invention, the movable floor F. For example, as best shown at FIG. 5, one of the side wall structures, which ordinarily includes studs 24, an outer skin plate 25 and an inner skin plate 26, may be modified slightly as by providing openings 27 in the studs 24 to receive the driving chain and sprockets driving the movable floor F to more effectively use the available space within the van, all as will be hereinafter further described. With such an arrangement, openings may be provided in the outer skin plate 25 for access to the components carried in the wall and these openings may be normally closed by doors 28.

Figure 6:
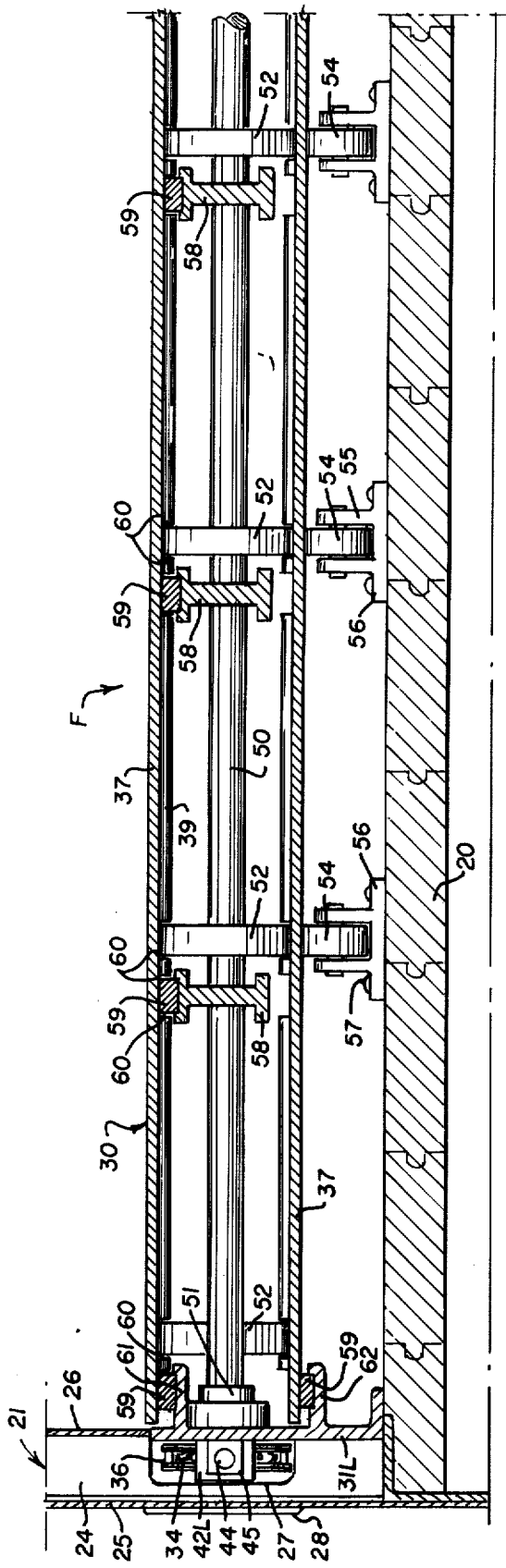
FIG. 6 is a transverse sectional view of one side of the truck deck and the movable floor, as taken from the indicated line 6—6 at FIG. 4.

FIG. 2 shows certain individual components and subassemblies of the movable floor F. The movable floor F is essentially a flattened endless belt 30 and the components within the embrace of this belt 30 which support its upper surface are held in place by side rails 31R and 31L. These side rails are secured to the deck 20 of the truck alongside each side wall 21, as best shown at FIG. 6. The movable floor extends between a forward roller 32 and a rear roller 33. Each roller is supported upon shafts 32a and 33a, respectively, which extend into bearings supported by the side rails, as will be described. The shafts 32a and 33a at one side of the rollers, illustrated as being at the lefthand side rail 31L, extend through this side rail to carry drive sprockets 34 and 35, respectively, and a drive chain 36 is extended about the forward and rear drive sprockets of the unit to drive the front and rear rollers in unison. The movable floor F is thus longitudinally disposed within and above the deck of the truck with its direction of movement being longitudinal with respect to the longitudinal axis of the truck. The belt 30 of this floor will span the truck deck 20 between the side rails 31R and 31L, which the drive sprockets 34 and 35 and the drive chain 36 are within the confines of the side wall 21L, as best illustrated at FIG. 6.

This belt 30 may be in the form of a continuous web of a comparatively rigid, pliable material but it is preferably of a comparatively rigid, pliable material. The belt must be rigid in its transverse span but flexible longitudinally to move about end rollers, hereinafter described. It is preferably an array of flat, comparatively narrow, transverse slats 37 having their edges pivotally interlocked together. Such slats are preferably made of aluminum or a similar light-weight metal easily extruded to a selected form. As such, each slat 37 is thick enough to provide a desirable degree of rigidity in and of itself in its transverse span, especially when it is supported at a number of intermediate points along its transverse reach. To effect a pivotal interlocking connection with adjacent slats, each slat has an enlarged, downturn head 38 along one edge and a mating downturned hook 39 along the opposite edge, the heads 38 and hooks 39 being so proportioned that the hook of one slat will pivotally embrace the head of the adjacent slat, as best illustrated at FIG. 3. The heads and hooks at the edges of these slats are downturned to present a flat surface movable floor as illustrated.

Because the downturned heads are directed inwardly when the belt 30 turns about a roller, the forward roller 32 and rear roller 33, between which the belt is suspended, must be modified to accommodate the shape of the belt as it moves around these rollers each accordingly, each roller 32 and 33, technically a cylinder, will appear in section as a geometrical polygon, such as the hexagons illustrated. Each polygon is cupped at each corner as at 40, where the flats 41 of the polygons would otherwise intersect. The cups 40 receive the head-hook connections 39 while the flats 41 are proportioned to register with the slats 37.

The shaft 32a of the forward roller 32 projects from each side of the roller and the projections extend into a bearing socket in adjustment slides 42R and 42L which in turn is slidably mounted in slots 43 in their respective side rails 31R and 31L. A take-up screw 44 is carried in a lug 45 outstanding from each side rail adjacent to the slot to engage the adjustment slide in the slot 43 and to forcibly shift the same to make tension adjustments to the belt 30. The left side adjustments slide 42L includes a slot 46 to receive the forward drive sprocket 34 as illustrated at FIGS. 5 and 8. The right side adjustment slide 42R, shown only at FIG. 2, is similar to slide 42L but with the slot 46 being omitted. The shaft 33a of the rearward roller 33 projects from each side of the roller to extend into bearings 47 which are mounted in the side rails 31R and 31L, as illustrated at FIG. 7. The drive sprocket 35 is mounted upon the projected end of the left side shaft 33a in alignment with sprocket 34. The chain 36 may thus be extended about these sprockets by providing suitable openings 27 in the studs 24 of the left side wall 21, as best illustrated at FIGS. 6 and 7. The chain is held tight and is driven by mechanisms hereinafter described.

In the present invention, a means is provided for supporting the reach of the movable floor between the forward and rearward rollers 32 and 33 at a number of locations across the transverse span of the floor. This support means includes a series of transversely-disposed, fixed shafts 50 which are mounted in sockets 51 in the side rails 31R and 31L at an elevation which spaces the shaft axes equally between the upper and the lower reaches of the belt forming the floor. A series of idler rollers 52 is located at selected spacings across each shaft and the diameter of each roller is such that it will engage the undersurface of the upper reach of the belt 30 and the upper surface of the lower reach of the belt. The number of idler rollers 52 on each shaft is optional and is predicated upon the strength of each transverse slat and the load to be placed upon the belt. For example, in the arrangement shown at FIG. 6, where approximately ½ the belt is shown, spacing for four such rollers is illustrated. These idler rollers are provided with bearings 53 to freely turn on their shafts 50 at their center. They are load supporting members and it is contemplated that they must resist loads far in excess of the strength or rigidity of the shaft 50 whereon they are mounted.

This is accomplished in a simple, unique manner by providing base rollers 54 at the deck of the truck with a base roller directly beneath each idler roller and contacting the lower surface of the lower reach of the belt. Each base roller is mounted in a U-shape bracket 55 having suitable flanges 56 at each side for the attachment of mounting screws 57 to the truck deck, as illustrated at FIGS. 4 and 6. Accordingly, a load imparted to an idler roller 52 as by loading the belt, will be transmitted from the upper reach of the belt 30 to the idler roller 52, thence from the lower reach of the belt and to the base roller 54 therebelow. This arrangement has the unique advantage of being very compact. For example, the base rollers 54 may be as small as, or even smaller than, 2 inches in diameter, while the idler rollers 52 need not be more than 3 or 4 inches in diameter. Accordingly, the entire space above the conventional deck 20 of the truck which will be taken up by the movable floor F need not be more than, say about 6 inches. For further compactness, the base rollers may be insert into the floor of the truck so that the top of the base rollers is less than approximately 1 inch above the deck surface 20. This will require a slight modification of the bracket 55, as by placing the flanges 56 at the top of the bracket in any suitable manner.

The supporting of the belt 30 by the rollers 52 is in an array of spaced point contacts arranged in a rectangular or like pattern because the rollers are located as spaced groups on each spaced shaft 50. This is suitable for flat surfaced loads. However, it is desirable to provide for continuous longitudinal supporting means at reasonably close spaced-apart locations over the upper surface of the belt to better carry concentrated loads which may bear upon a given slat 37 at positions between the shafts supporting the rollers 52. Accordingly, a group of longitudinally extended I-beams 58 of comparatively heavy construction is carried upon the shafts 50 adjacent to each roller 52, as shown at FIG. 6. Each I-beam 58 extends above the shaft 50 to carry an anti-friction strip 59 at its top to engage the undersurface of the upper reach of the continuous belt 30. Thus, the I-beams 58 will continuously support practically any type of load placed upon the belt. Since these I-beams are secured to the shafts alongside the idler rollers 52, it follows that the I-beams are supported directly by the rollers 52 and not by the shafts 50. Any load imposed upon the I-beams is transmitted directly to the adjacent rollers and thence to the base rollers 54 at the deck of the truck. Should the arrangement be otherwise, the shafts 50, unless made unusually large, could easily flex out of position whenever the I-beams were loaded.

It is to be noted that the depending head 38-hook 39 connection at the edges of the interlocked slats must be cut away as at 60, at the locations where the idler rollers 52 are mounted and where the I-beams 58 are located, as best shown in FIGS. 6 and 8. This is necessary to provide an uninterrupted path on the belt for the rollers as the belt moves past the rollers and also a flat smooth contact surface at the underface of the slats 37 for the anti-friction strip 59 of each I-beam 58.

In addition to supporting the upper surface of the belt by the I-beams, the edges of this belt, closely alongside the side rails 31R and 31L, are supported upon shelves 61 outstanding from the side rails directly underneath the belt surface. Each of these shelves also requires an anit-friction strip 59 against which the underside of the deck slats 37 will lie to function as hereinabove described. The lower reach of the segmented belt will not be subjected to any load except its own weight and hence the spaced longitudinal slides to provide continuous support at intermediate locations are unnecessary. However, a lower shelf 62 outstands from each side rail 31R and 31L immediately below this lower reach of the belt and will include an anti-friction slide 59 for supporting and holding this lower reach of the belt in place.

An important feature of the present invention resides in the fact that plastic technology has now developed and perfected anti-friction materials having outstanding properties and especially remarkable toughness and strength. Several such materials may be used for the purpose at hand with good results. One type of anti-friction slide is nylon impregnated with molybdenum sulphide. Another type is the anit-friction plastic commonly known as Teflon. With either type of material or other comparable materials, the frictional resistance upon the slide strips 59, 61 and 62 is minimal even when heavy loads are placed upon the continuous belt. This makes the driving of the belt to load and unload it a simple matter.

The drive for the belt will be associated with the drive chain 36 and will include a motor 65. Simple, compact, reversible hydraulic or electrical motors having a high torque output are easily available and such a motor may be mounted upon the deck of the truck, as in a pocket 66, to lie below the continuous belt such as in the manner illustrated at FIG. 7. The drive shaft 67 of the motor, or an extension of this shaft, will extend through a bearing 68 in the side rail 31L and to the plane of the drive chain 36 and the sprockets carrying this chain. A drive sprocket 69 is mounted upon this shaft 67 and preferably this is a small diameter sprocket to gain as much leverage as possible and to permit the unit to be mounted in place without clearance problems.

In order to more effectively wrap the chain about the drive sprocket 69, which will lie beneath the sprockets 34 and 35, a chain tightener may be provided. The tightener includes a slide 70 which is mounted in a slot 71 in the side rail 31L. This slide is U-shaped and carries an idler sprocket 72 between the arms of the U in an arrangement which permits the idler sprocket to engage the chain as best illustrated at FIG. 5. The slide 70 is held in position by an adjustment screw 73 mounted in a lug 74 outstanding from the face of the side rail 31L.

The controls, either switches or valves, to operate the motor are not shown since the same are essentially conventional and it is contemplated that the movable floor can be moved forwardly into the van to effect loading of the van, or to reverse to effect unloading of the van. Also, the movable floor can stop at any desired location. It is contemplated that maintenance of this apparatus will be a simple matter. The movable belt will be protected against permitting objects to move underneath it by the use of a baffle plate 75 at the rear of the van which upstands across the lower rear edge of the truck deck to protect the unit from objects being lodged underneath the movable floor at that end of the truck. A similar baffle angle 76 is mounted at the front wall 23 of the truck, as shown at FIG. 4. The edge of this baffle angle is extended across the truck a short distance above the movable floor to prevent objects from falling behind the floor at that end of the unit. It is contemplated that the movable floor will have to be tightened from time to time and that the shafts 32a will need to be lubricated. It is a simple matter to use the openings in the outer plate of the side walls of the van which are normally closed by the doors 28 whenever maintenance or service is needed.

FIG. 9 shows, diagrammatically, a modified arrangement for a movable floor for a van or other truck unit where the floor is actually formed as three individual movable floor units in tandem. The three units Fa, Fb and Fc are shown at that FIG. without illustrating the several of the details of these units because such details will be the same as hereinbefore described, the arrangement being simply the use of three independent movable floor units F mounted on common rails 31L and 31R in tandem.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and

I claim:

1. A movable floor adapted to be mounted upon a deck means of a truck or the like, comprising in combination:
   a. a continuous flat belt spaced between forward and rearward rollers, being longitudinally flexible to move about the rollers and having a limited, lateral rigidity insufficient to support a load on its top surface without intermediate supports;
   b. left side and right side longitudinal rail means upstanding and extending alongside the respective sides of the deck including bearing means at their forward and rearward ends to support the respective forward and rearward rollers with the belt being spaced between them;
   c. a drive means associated with the rollers to drive the belt;
   d. a transverse intermediate support means held by the longitudinal rail means and comprising transverse shaft means at selected spacings along the longitudinal reach of the belt and between the upper and lower reaches of the belt, idle rollers mounted upon the transverse shaft means at selected transverse load supporting locations on the shafts and engaging the top surface of the bottom reach of the belt and longitudinal belt supporting slide-beam means mounted upon the transverse shaft means with each slide-beam means being alongside and adjacent to an idle roller at each shaft, and extending upwardly from the shaft to slidably engage and support the underside of the upper reach of the belt so that the load upon the belt supporting slide-beam means can be easily and directly transferred from the belt supporting slide-beam means through the shaft means and the idle rollers without deflecting the shaft means; and
   e. a supplement support means supported upon the deck means underneath the lower reach of the belt and supporting the undersurface of the lower reach of the belt at a plurality of selected locations directly below the aforesaid idle rollers whereby a load upon the upper reach of the belt, which is imparted to the longitudinal belt supporting slide-beam means, thence to the rollers and thence to the lower reach of the belt, is supported upon the the supplement support means.

2. In the organization defined in claim 1 wherein the supplement support means includes a plurality of base rollers and the idle rollers have a diameter sufficient to engage the undersurface of the top reach of the belt and each idler roller is located directly above a base roller.

3. In the organization defined in claim 2 wherein: each of said transverse shaft means is secured to the side rails and said idle rollers are located on the shafts at selected spacings across each shaft.

4. In the organization defined in claim 1, including an anti-friction strip at the top of each slide beam means engaging the undersurface of the top reach of the belt.

5. In the organization defined in claim 1, wherein: said belt comprises an array of transversely disposed slats which are pivotally interconnected at their abutting edges.

6. In the organization defined in claim 5 wherein: the pivotal connection of slats at the abutting edges comprises a head on one slat and a hook at the other slat embracing the head.

7. In the organization defined in claim 5 wherein: said rollers are cylindrical members polygonal in section and are proportioned so that the slats of the belt mesh with the surfaces of the cylinder as the slats wrap about the cylinders.

8. A movable floor adapted to be mounted upon the deck of a van with walls having an outer skin plate and an inner skin plate held in place by an array of studs and comprising, in combination:
   a. a continuous, flat belt spaced between forward and rearward rollers held on roller shafts, said belt being longitudinally flexible to move about the rollers and having a limited lateral rigidity insufficient to support a load on its top surface without intermediate supports;
   b. left side and right side rail means unstanding and extending alongside the respective inner skin plates of the van walls;
   c. bearing means at the forward and rearward ends of each side rail means supporting the roller shafts of the forward and rearward belt supporting rollers;
   d. a transverse intermediate support means held by the left side and right side rail means extending between the upper and lower reaches of the belt supporting the undersurface of the upper reach of the belt and engaging the upper surface of the lower reach of the belt to thereby support the upper reach of the belt and rest upon the lower reach of the belt;
   e. a supplement support means supported upon the deck underneath the lower reach of the belt and supporting the undersurface of the lower reach of the belt to permit the underreach of the belt to support the aforesaid intermediate support means;
   f. a drive means associated with the rollers to drive the belt including portions of the roller shafts extended through a side rail and sprockets mounted upon the shafts in the spacing between inner and outer skin plates of the side wall; and
   g. a chain means extending about the sprockets with the aforesaid side wall studs being notched to accommodate the sprockets and chain means.

* * * * *

UNITED STATES PATENT OFFICE
CERTIFICATE OF CORRECTION

PATENT NO. : 3,913,760
DATED : October 21, 1975
INVENTOR(S) : Ephraim Koral

It is certified that error appears in the above-identified patent and that said Letters Patent are hereby corrected as shown below:

Col. 3, line 28, "which" should read -- while --;
      line 32, insert a period -- . -- after "material";
      lines 32 and 33, delete "but it is preferably of a comparatively rigid, pliable material.";
      line 52, "surface" should read -- surfaced --;
      line 57, "each" should read -- and --.
Col. 4, line 6, "adjustments" should read -- adjustment --;
      line 47, insert "being" between "roller" and "directly".
Col. 7, line 37 (Claim 1), after "means and", insert -- to --.

Signed and Sealed this sixth Day of January 1976

[SEAL]

Attest:

RUTH C. MASON
*Attesting Officer*

C. MARSHALL DANN
*Commissioner of Patents and Trademarks*